(12) United States Patent
Bells et al.

(10) Patent No.: US 7,200,819 B2
(45) Date of Patent: Apr. 3, 2007

(54) GRAPHICS STACK SYSTEM AND METHOD

(75) Inventors: Matthew Bells, Waterloo (CA); Brian A. Young, Waterloo (CA)

(73) Assignee: Research In Motion Limited, Waterloo (CA)

( * ) Notice: Subject to any disclaimer, the term of this patent is extended or adjusted under 35 U.S.C. 154(b) by 754 days.

(21) Appl. No.: 10/189,715

(22) Filed: Jul. 3, 2002

(65) Prior Publication Data
US 2003/0020740 A1 Jan. 30, 2003

Related U.S. Application Data

(60) Provisional application No. 60/302,871, filed on Jul. 3, 2001.

(51) Int. Cl.
*G06F 3/00* (2006.01)
*G06F 3/14* (2006.01)

(52) U.S. Cl. .............. 715/815; 715/765; 715/864; 715/866; 345/162; 345/169; 345/530

(58) Field of Classification Search ............. 715/700, 715/762, 764, 765, 853, 864, 866, 781, 815; 345/162, 169, 173, 530
See application file for complete search history.

(56) References Cited

U.S. PATENT DOCUMENTS 4,449,201 A * 5/1984 Clark ................ 345/561
5,255,359 A * 10/1993 Ebbers et al. ............ 345/642
5,619,628 A * 4/1997 Fujita et al. ............. 345/427
5,754,189 A * 5/1998 Doi et al. ................. 345/473
5,907,704 A * 5/1999 Gudmundson et al. ..... 717/100
6,088,786 A * 7/2000 Feierbach et al. .......... 712/200
6,614,541 B1 * 9/2003 Fritz et al. ................ 358/1.11
6,748,570 B1 * 6/2004 Bahrs et al. ............... 715/526
2002/0060701 A1 * 5/2002 Naughton et al. .......... 345/853
2002/0180792 A1 * 12/2002 Broussard .................. 345/764

OTHER PUBLICATIONS

M. Woo, et al., OpenGL Programming Guide, 2nd Edition, The Official Guide to Learning OpenGL, Version 1.1, 1997 Silicon Graphics Inc., ISBN 0-201-46138-2, Chapter 3, pp. 132-134.
Rotman, Joseph J.; A First Course in Abstract Algebra, 1996 Prentice-Hall, Inc., ISBN 0-13-311374-4, pp. 67-82.

* cited by examiner

*Primary Examiner*—Lucila X. Bautista
(74) *Attorney, Agent, or Firm*—Jones Day; Krishna K. Pathiyal; Robert C. Liang

(57) ABSTRACT

A system and method are provided for drawing graphics, such as to display a user interface on a display of a mobile device. A graphics stack is used to store pre-computed coordinate values to improve performance for drawing graphics, such as to display a user interface on a display of a mobile device.

45 Claims, 20 Drawing Sheets

GRAPHICS STACK SYSTEM AND METHOD

CROSS-REFERENCE TO RELATED APPLICATION

This application claims priority to U.S. provisional application Ser. No. 60/302,871 (entitled "Graphics Stack System and Method" filed Jul. 3, 2001). By this reference, the full disclosure, including the drawings, of U.S. provisional application Ser. No. 60/302,871 is incorporated herein.

BACKGROUND OF THE INVENTION

1. Field of the Invention

This invention relates to display generation, and more particularly to display generation for a mobile device.

2. Description of the State of the Art

Sun Microsystems Java awt technology uses a framework of user interface objects, some of which implement drawing functionality in a paint(Graphics g) method. User interface objects with a paint method include Component objects, as well as Container objects capable of holding other Component and Container objects thereby creating a hierarchy with Component and Container objects having a child/parent relationship. The Component and Container objects request drawing operations from the Graphics object in local coordinates, and are positioned in their parent Container object coordinates. However, awt technology may not address the computational power limitations of a mobile device and therefore may not be an adequate solution for drawing a user interface on a mobile device display.

SUMMARY

In accordance with the teachings disclosed herein, a system and method are provided for drawing graphics, such as to display a user interface on a display of a mobile device. A graphics stack is used to store pre-computed coordinate values to improve performance for drawing graphics, such as to display a user interface on a display of a mobile device. Further features of the invention will be described or will become apparent in the course of the following detailed description.

BRIEF DESCRIPTION OF THE DRAWINGS

Same reference numerals are used in different figures to denote similar elements.

DETAILED DESCRIPTION

In reference to FIG. 1, a top view of a mobile device featuring a graphics display will be described presently. Mobile device 10 is a mobile communications device such as a data communication device. Alternate mobile devices are envisaged, such that mobile device 10 can be a cellular telephone, or a portable data assistant (PDA). The mobile device 10 has a display 20 in order to display graphics. Display 20 is a 160×160 pixel Liquid Crystal Display (LCD). Alternate displays are envisaged, such as Thin Film Transistor (TFT) displays, colour displays, so long as the display can perform drawing operations to show graphics. The invention works equally well with displays having a different number of pixels than the exemplary 160×160 pixel LCD.

Figure 1:
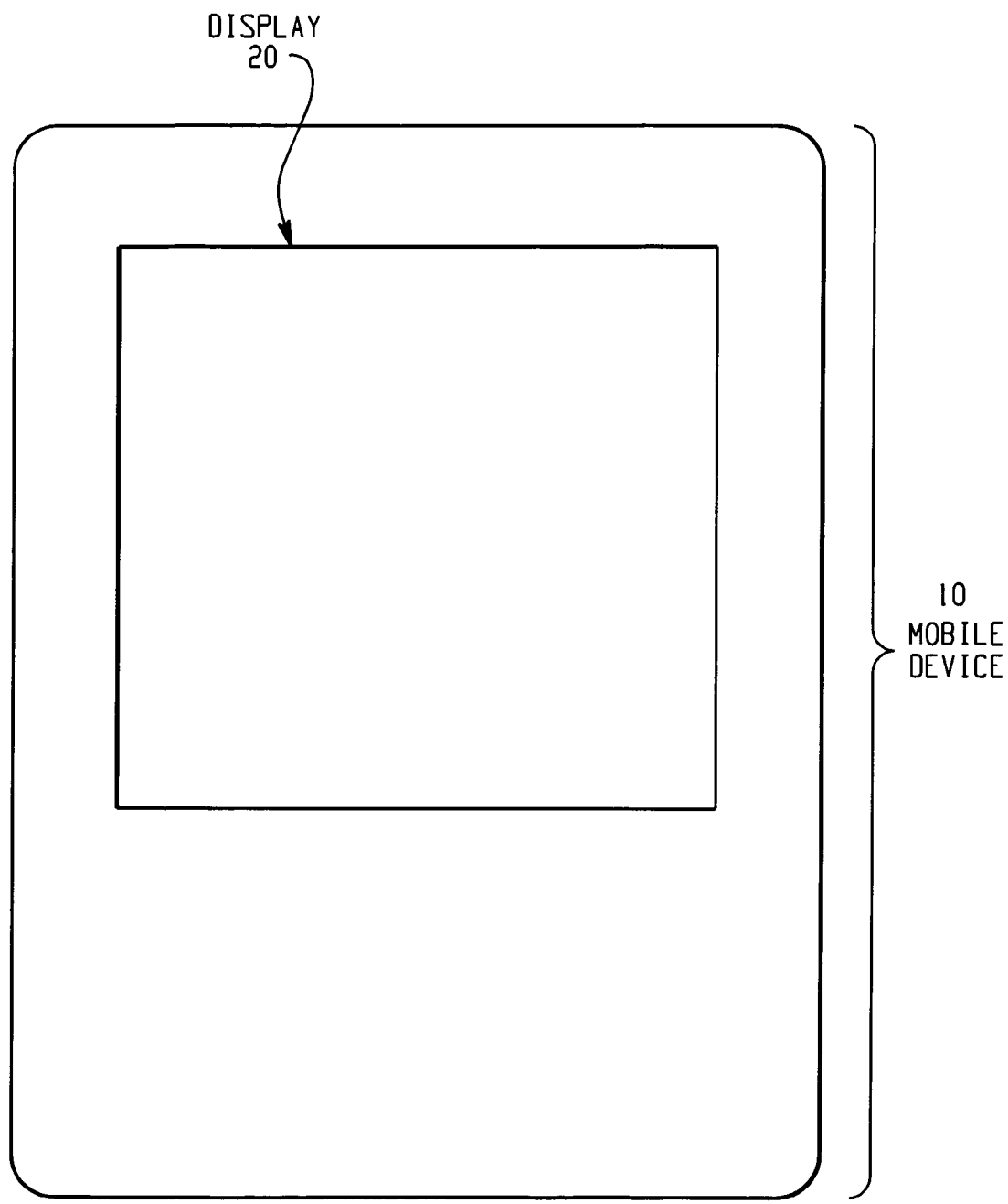
FIG. 1 is a top view of a mobile device featuring a graphics display.

In reference to FIG. 2, a top view of the mobile device display 20 of the device 10 of FIG. 1 is illustrated, showing the drawing offset and clip rectangle of a Screen object, and will be described presently. Drawing offset 30S is a point (0,0) in the coordinate system of the display 20 from which subsequent drawing will occur when the Screen object is currently being drawn. Also illustrated are the positive x direction 33S and positive y direction 37S for drawing coordinates in the Screen object. Four points delineate clip rectangle 40S: top-left 42S, top-right 44S, bottom-right 46S, and bottom-left 48S. The portion of the display bound by the clip rectangle 40S represents the area of the display 20 which can be drawn. For instance, it a drawing operation is issued from within the context of the Screen object, the drawing operation will be performed relative to offset 30S, and will only affect the display 20 within the clip rectangle 40S. The Screen object acts as a base graphics object for all other graphics objects to be laid on to, i.e. the Screen object is the top of the hierarchy. Offset 30S and clip rectangle 40S provide a base graphics context. Also shown is the result 50S of drawing operations performed by the Screen object relative to the graphics context. In the case of the current Screen object, the result 50S of drawing is to clear the clip rectangle 40S.

In reference to FIG. 3, the drawing offset and clip rectangle of a Title object are illustrated and will be described presently. The Title object is a child of the Screen object illustrated in FIG. 2. Consequently, the Screen object is the parent of the Title object. Drawing offset 30T is at point (0,0)—the upper left corner. Clip rectangle 40T is as tall as a character glyph and as wide as the Screen object—as illustrated by the four points: top-left 42T, top-right 44T, bottom-right 46T, and bottom-left 48T. Note that all points are illustrated using display coordinates to facilitate the description only—in practice many coordinate systems may be used, such as parent relative coordinates, or child relative coordinates. The result 50T of drawing operations performed by the Title object relative to the graphics context is also shown: the text "Title: Some Title Text" is drawn.

Figure 3:
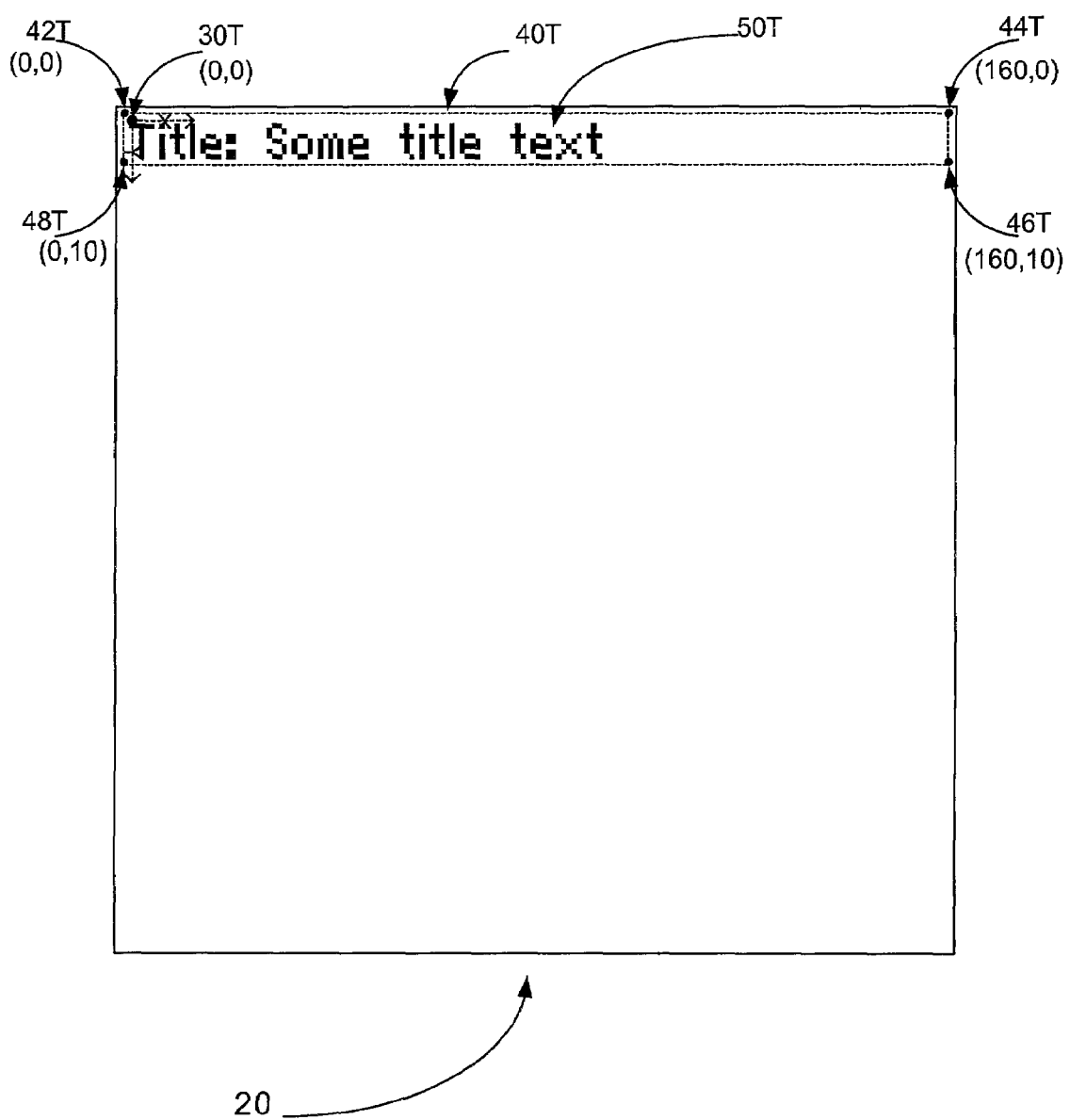
FIG. 3 illustrates the drawing offset and clip rectangle of a Title object, according to the present invention.
Figure 4:
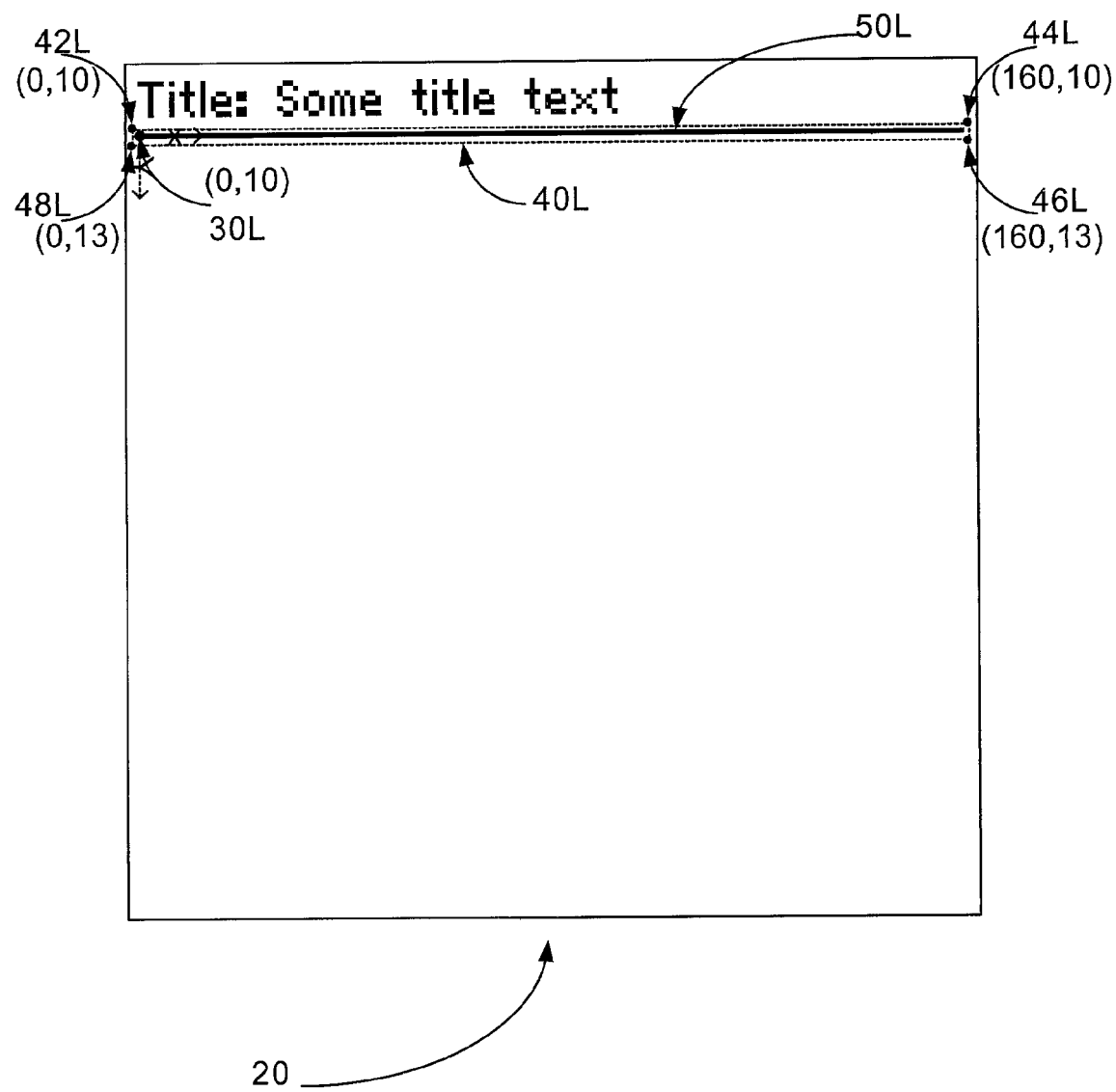
FIG. 4 illustrates the drawing offset and clip rectangle of a SeparatorBar object, according to the present invention.

In reference to FIG. 4, the drawing offset and clip rectangle of a SeparatorBar object are illustrated. The SeparatorBar object is a child of the Screen object illustrated in FIG. 2. Consequently, the Screen object is the parent of the SeparatorBar object. Drawing offset 30L is at point (0,10)—immediately below the Title object of FIG. 3. Clip rectangle 40L is 3 pixels tall and as wide as the Screen object—as illustrated by the four points: top-left 42L, top-right 44L, bottom-right 46L, and bottom-left 48L. The result 50L of drawing operations performed by the Title object relative to the graphics context is also shown: the text "Title: Some Title Text" is drawn.

Figure 5:
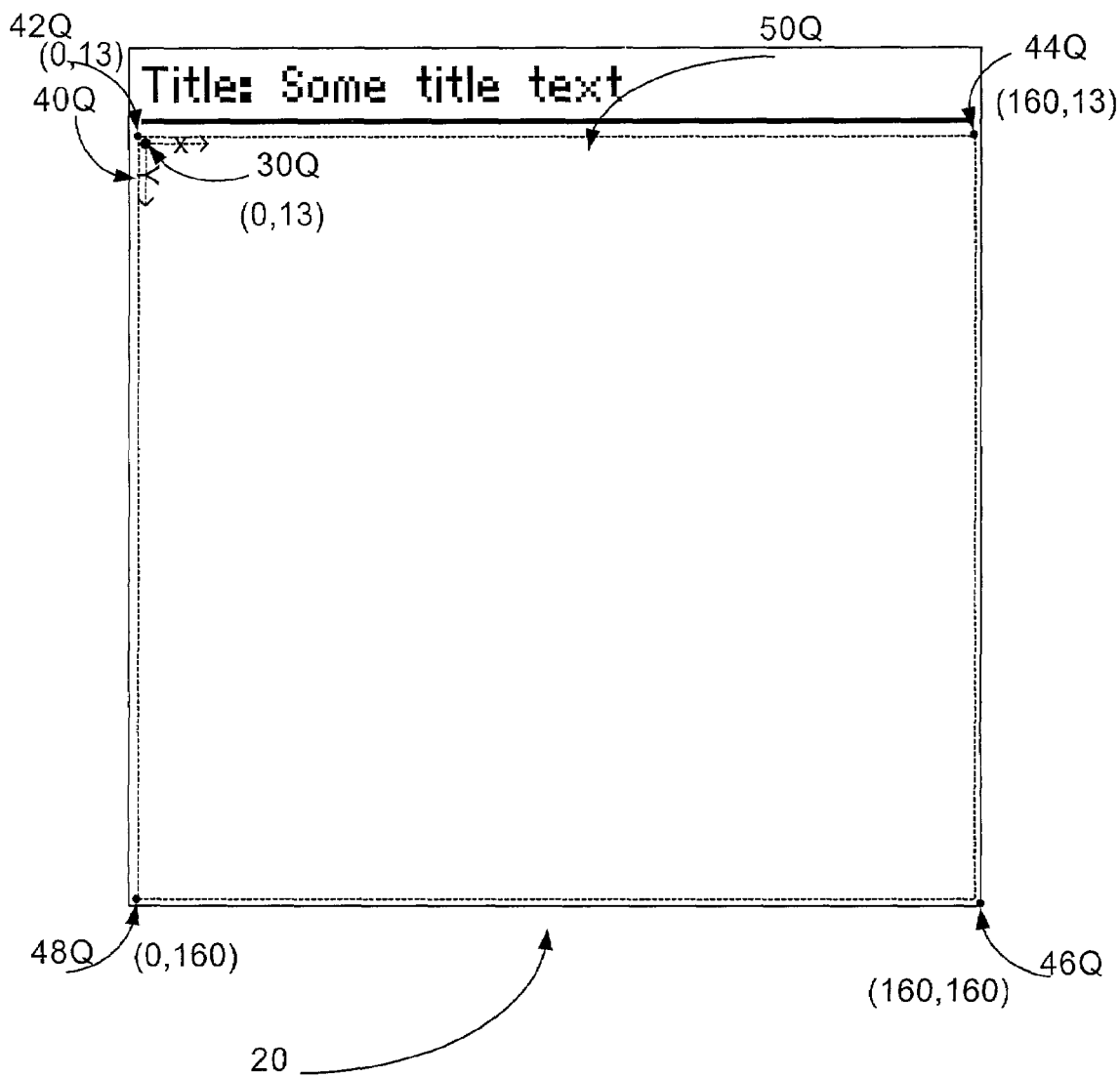
FIG. 5 illustrates the drawing offset and clip rectangle of a Scroller object, according to the present Invention.

In reference to FIG. 5, the drawing offset and clip rectangle of a Scroller object are illustrated and described presently. The Scroller object is a child of the Screen object illustrated in FIG. 2. Consequently, the Screen object is the parent of the Scroller object. Drawing offset 30Q is at point (0,13)—immediately below the SeparatorBar object of FIG. 4. Clip rectangle 40Q is as tall and as wide as the remaining portion of the Screen object—as illustrated by the four points: top-left 42O, top-right 44Q, bottom-right 46Q, and bottom-left 48O. The Scroller object does not perform any drawing 50Q—instead it acts as a view port for holding child objects that can be wider or taller than the view port. This will be described in greater detail in reference to FIGS. 8 and 9.

Figure 6:
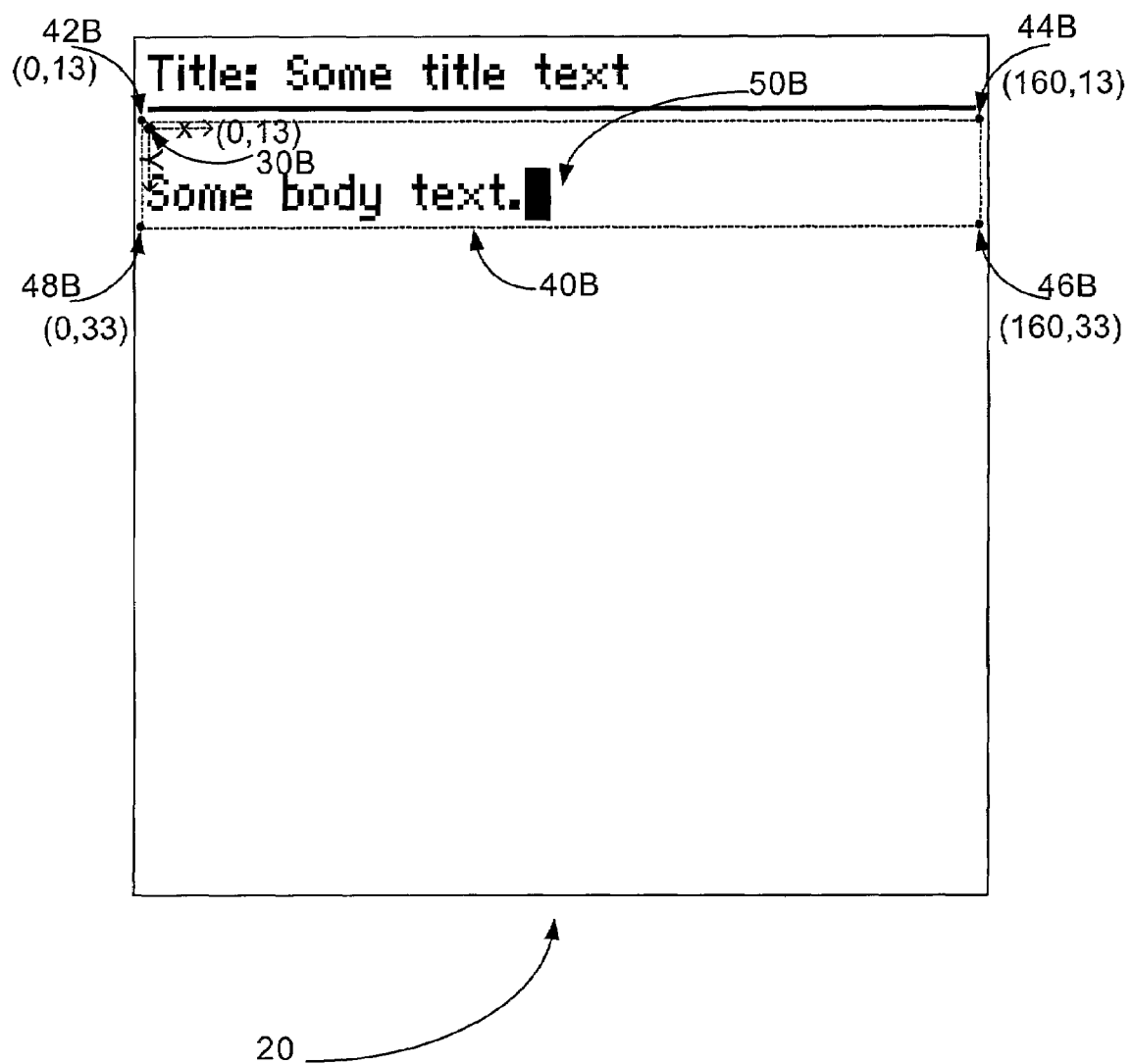
FIG. 6 illustrates the drawing offset and clip rectangle of a Text object, according to the present invention.

In reference to FIG. 6, the drawing offset and clip rectangle of a Text object are illustrated and described presently. The Text object is a child of the Scroller object illustrated in FIG. 5. Consequently, the Scroller object is the parent of the Text object. Drawing offset 30B is at point (0,0)—the upper left corner of the Scroller object. Note that Text object Drawing offset 30B which is at point (0,0) in the view coordinate system translates to (0,13) in the screen coordinate system. Clip rectangle 40B is as tall as two character glyphs—in order to display the two lines of text illustrated—and as wide as the Screen object—as illustrated by the four points: top-left 42B, top-right 44B, bottom-right 46B, and bottom-left 48B. The result 50B of drawing operations performed by the Text object relative to the graphics context is also shown: a first blank line of text is followed by the line of text "Some body text.", which in turn is followed by a rectangular cursor. The cursor illustrates that a user is interacting with device 10 in order to edit a memo, the text of which is displayed 50B by the Text object.

Figure 7:
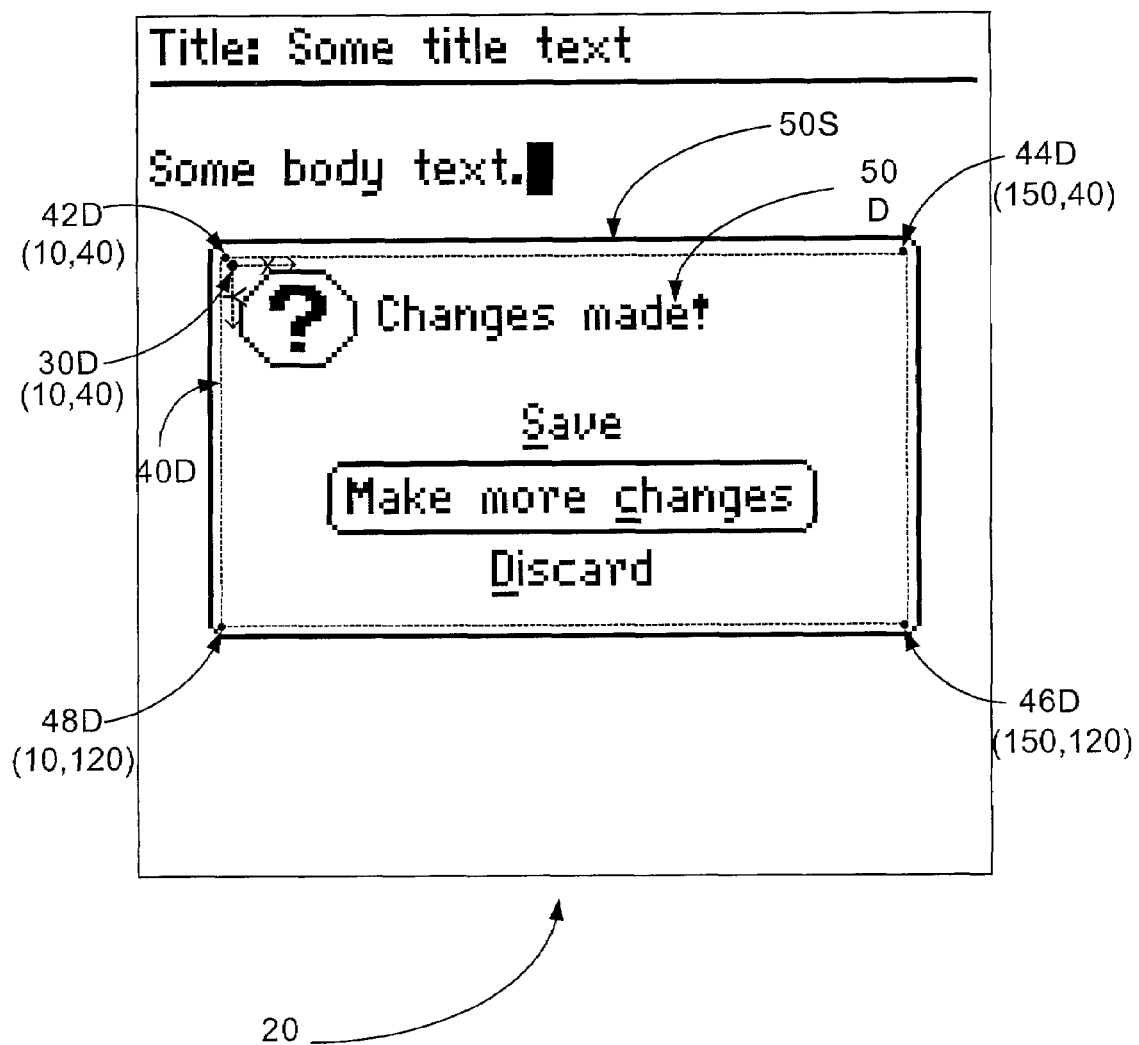
FIG. 7 illustrates the drawing offset and clip rectangle of a Dialog object, according to the present invention.

In reference to FIG. 7, the drawing offset and clip rectangle of a Dialog object are illustrated and described presently. The Dialog object is a child of the Screen object illustrated in FIG. 2. Consequently, the Screen object is the parent of the Dialog object. However, the Dialog object is used in a different context than the other objects that also have the Screen object as a parent such as the Title object of FIG. 3, the SeperatorBar object of FIG. 4, and the Scroller object of FIG. 5. The Dialog object is typically used in a modal context whereby normal user interaction is Interrupted until the Dialog context is destroyed. In the example, the user has triggered the Dialog object by attempting to close the Text object of FIG. 6. Consequently, the Dialog prompts the user to save, make more changes, or discard the changes. Drawing offset 30D is at point (10,40). Clip rectangle 40D is 80 pixels tall and 140 pixels wide resulting in a Dialog which is cantered with respect to the Screen object—as illustrated by the four points: top-left 42D, top-right 44D, bottom-right 46D, and bottom-left 48D. The result 50T of drawing operations performed by the Dialog object and its children relative to the graphics context is also shown: a question mark "?" icon, the text "Changes Made!", and the three choice buttons labelled "Save", "Make more changes", and "Discard". Note that the details of the drawing offset and clip rectangles for the child objects of the Dialog have been omitted in order to keep the description focused on the fact that a second context is provided. Also shown are the results 50T, 50L, 50B of the other context. Note also that the rounded rectangle surrounding the Dialog is the result of drawing operations in the Screen object.

In order to illustrate the use of the Scroller object of FIG. 5, it is assumed that the user has pressed the selected button labelled "Make more changes". Two cases are illustrated separately in FIGS. 8 and 9. First, in FIG. 8 the case where text has been entered which exceeds the width of the Scroller is illustrated. Next, In FIG. 9 the case where text has been entered which exceeds the height of the Scroller is illustrated.

Figure 8:
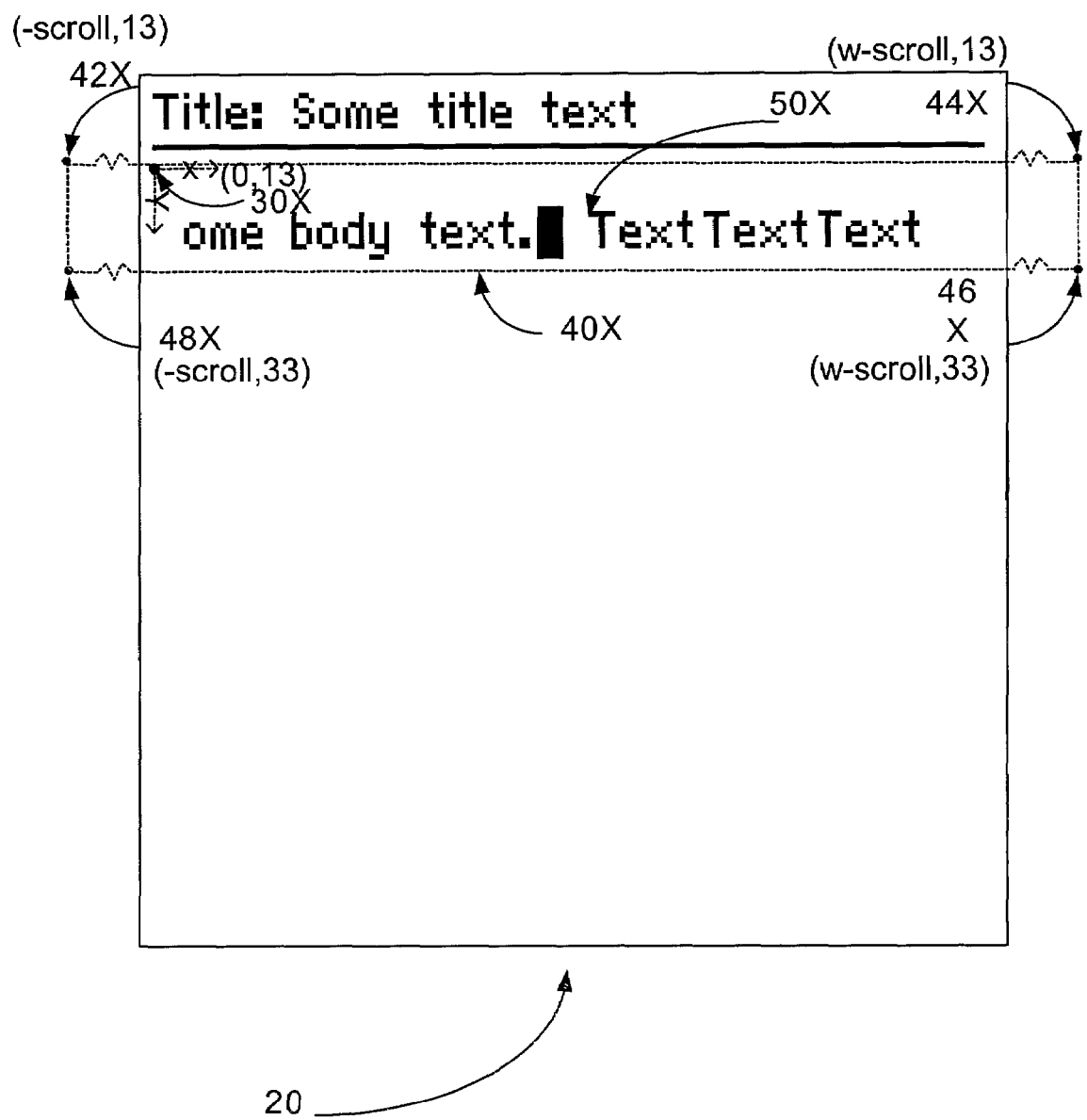
FIG. 8 Illustrates the drawing offset and clip rectangle of the Text object of FIG. 6 wherein the Text object is wider than the Scroller, according to the present invention.

In reference to FIG. 8, the drawing offset and clip rectangle of the Text object of FIG. 6 (wherein the Text object is wider than the Scroller) are illustrated and described presently. The Text object holds text that is still 2 lines tall, but is now "w" pixels wide. Drawing offset 30X is still at point (0,13)—however the clip rectangle 40X is now delineated by left side points 42X, 48X that are translated along the X axis towards the left by the "scroll" value, and right side points 44X, 46X that are translated along the X axis towards the right by the portion of the width of the Text object which exceeds the Scroller width. The user controls the "scroll" value by displacing the cursor or by using a thumbwheel on device 10 so as to displace the contents of the text object left or right. Prior to drawing 50X, all the clip rectangles 50S,Q,X in the object hierarchy of the Text object are taken into account, thereby ensuring that no drawing operations occur outside the bounds of display 20.

Figure 9:
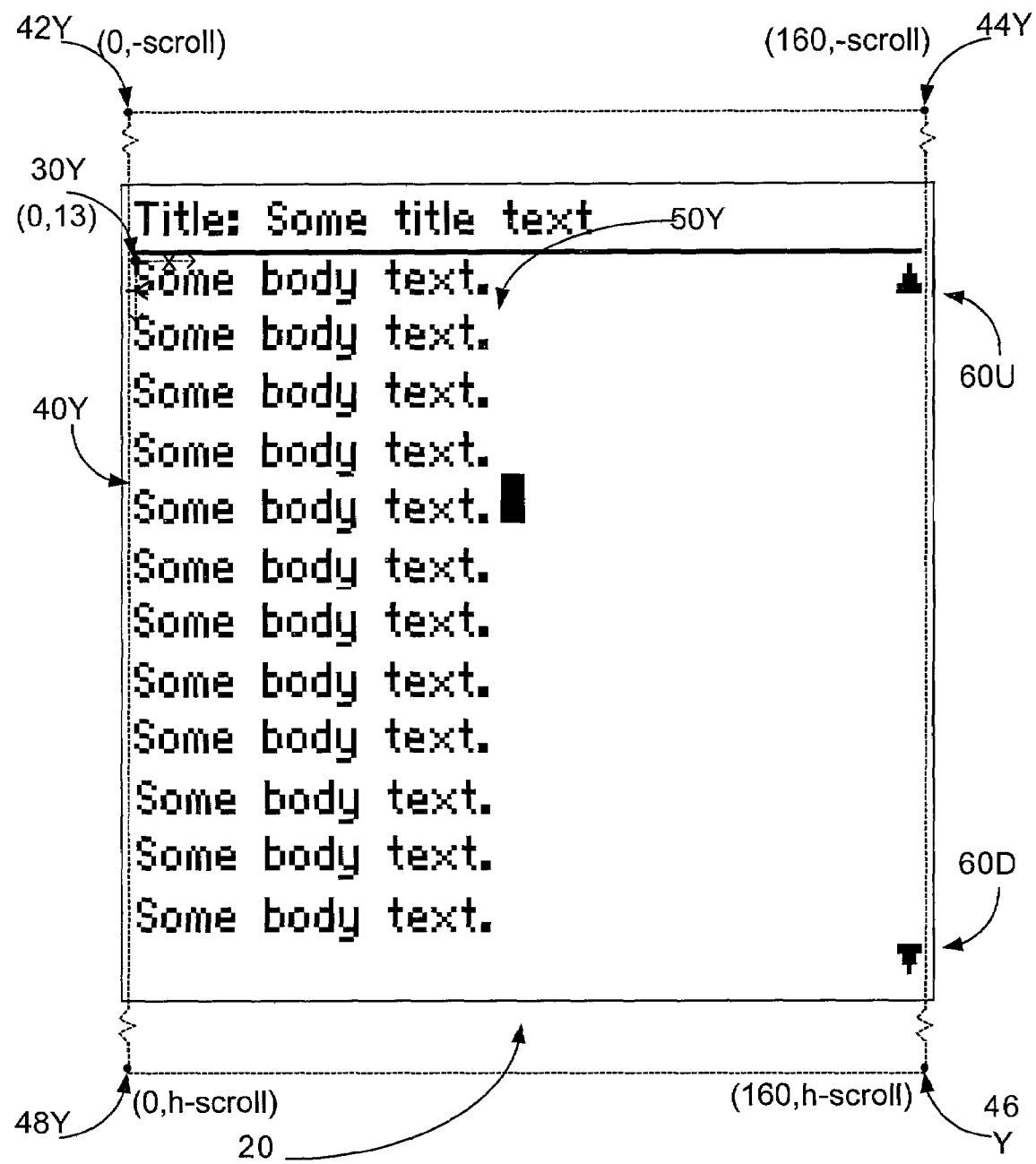
FIG. 9 illustrates the drawing offset and clip rectangle of the Text object of FIG. 6 wherein the Text object is taller than the Scroller, according to the present invention.

In reference to FIG. 9, the drawing offset and clip rectangle of the Text object of FIG. 6 (wherein the Text object is taller than the Scroller) are illustrated and described presently. The Text object holds text that is still 160 pixels wide, but now is h pixels tall. Drawing offset 30Y is still at point (0,13)—however the clip rectangle 40Y is now delineated by top points 42Y, 44Y that are translated along the Y axis towards the top by the "scroll" value, and bottom points 46Y, 48Y that are translated along the Y axis towards the bottom by the portion of the height of the Text object which exceeds the Scroller height. The user controls the "scroll" value by displacing the cursor or by using a thumbwheel on device 10 as to displace the contents of the text object up or down. Prior to drawing 50Y, all the clip rectangles 50S,Q,Y in the object hierarchy of the Text object are taken into account, thereby ensuring that no drawing operations occur outside the bounds of display 20.

Figure 10:
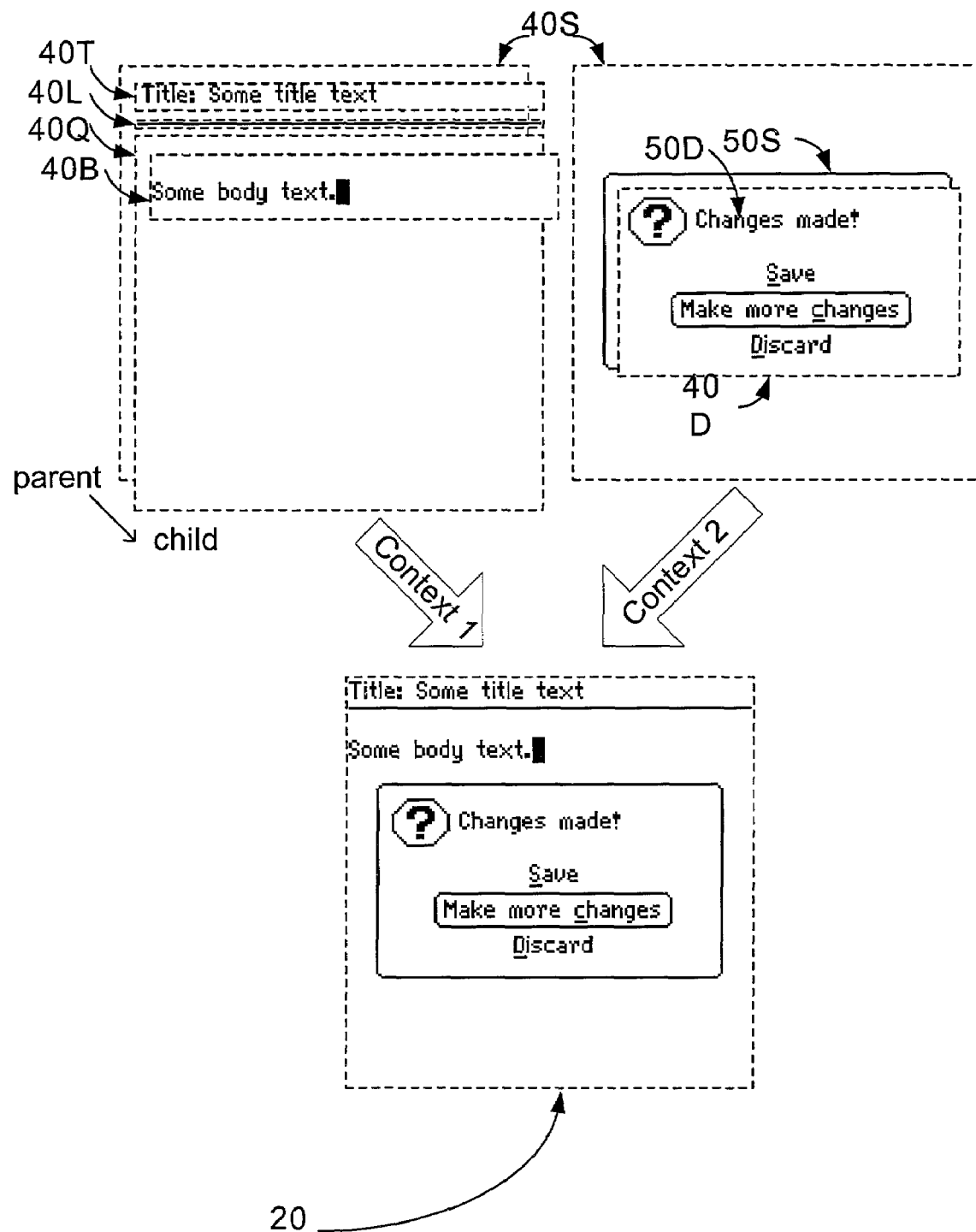
FIG. 10 illustrates the layering of the objects of FIGS. 2–7 into two contexts that are combined, according to the present invention
Figure 11A:
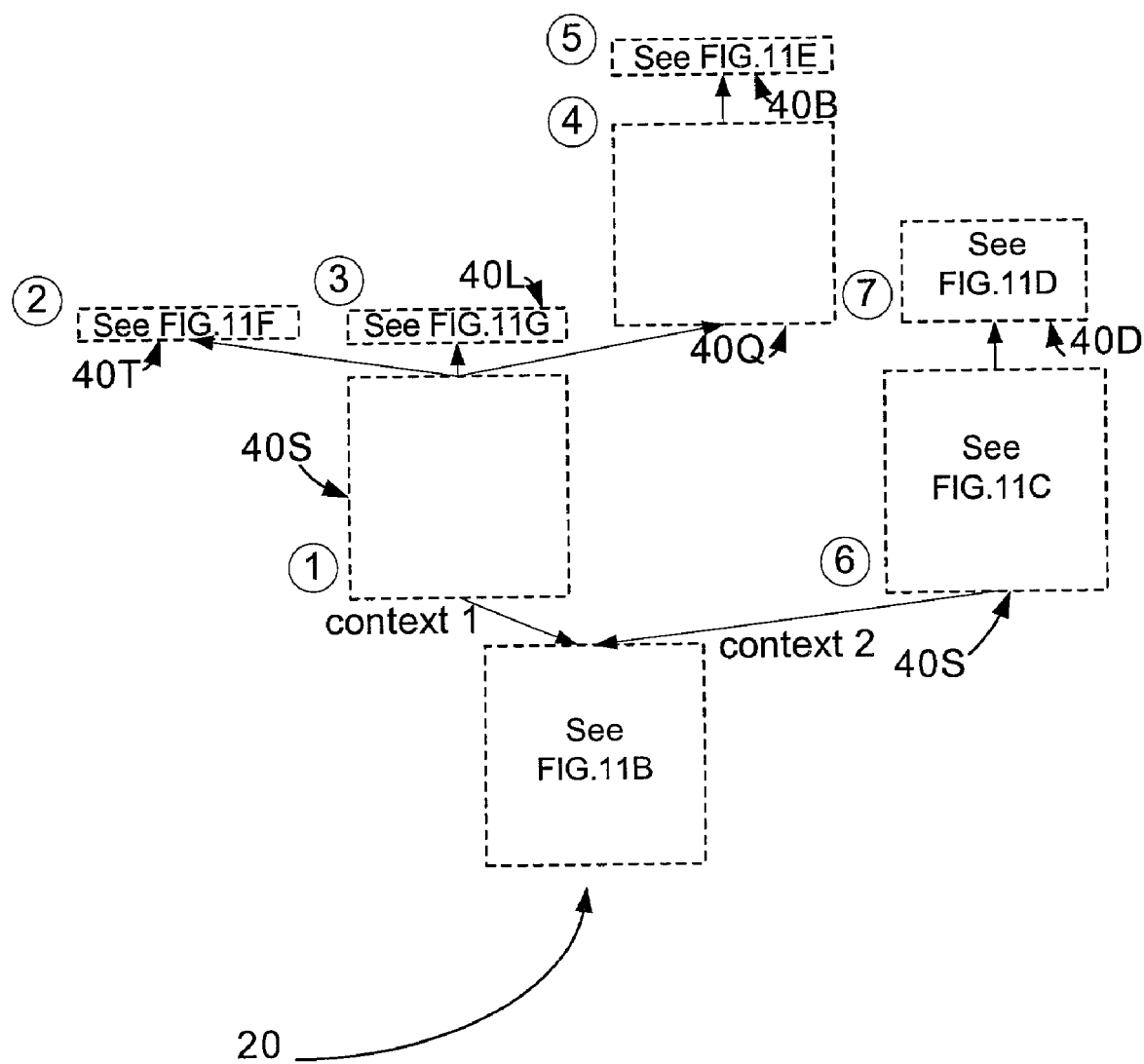
FIGS. 11A–G illustrate the drawing order of the objects of FIGS. 2–7 as represented by a tree with child and parent graphical objects, according to the present invention.
Figure 11B:
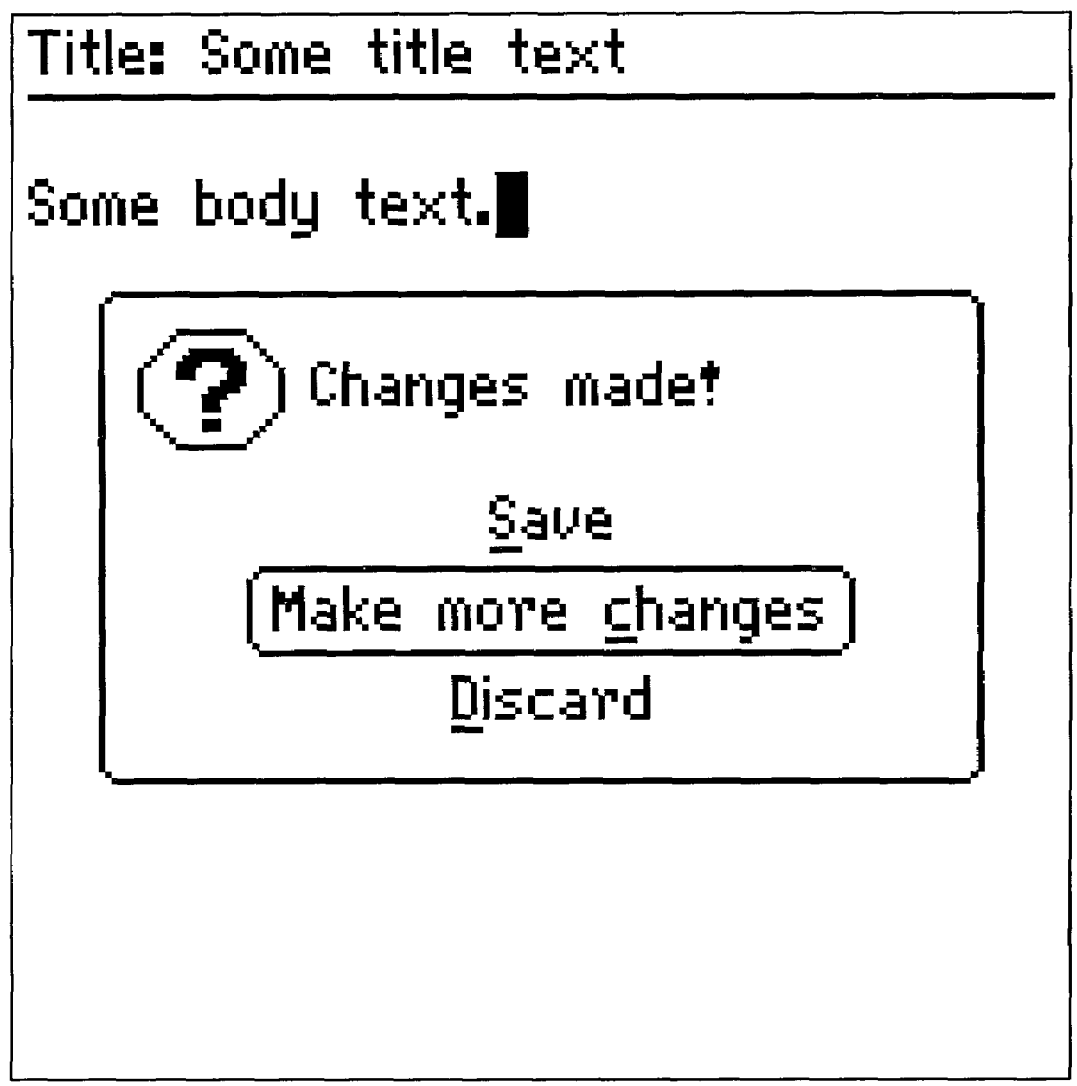
Figure 11C:
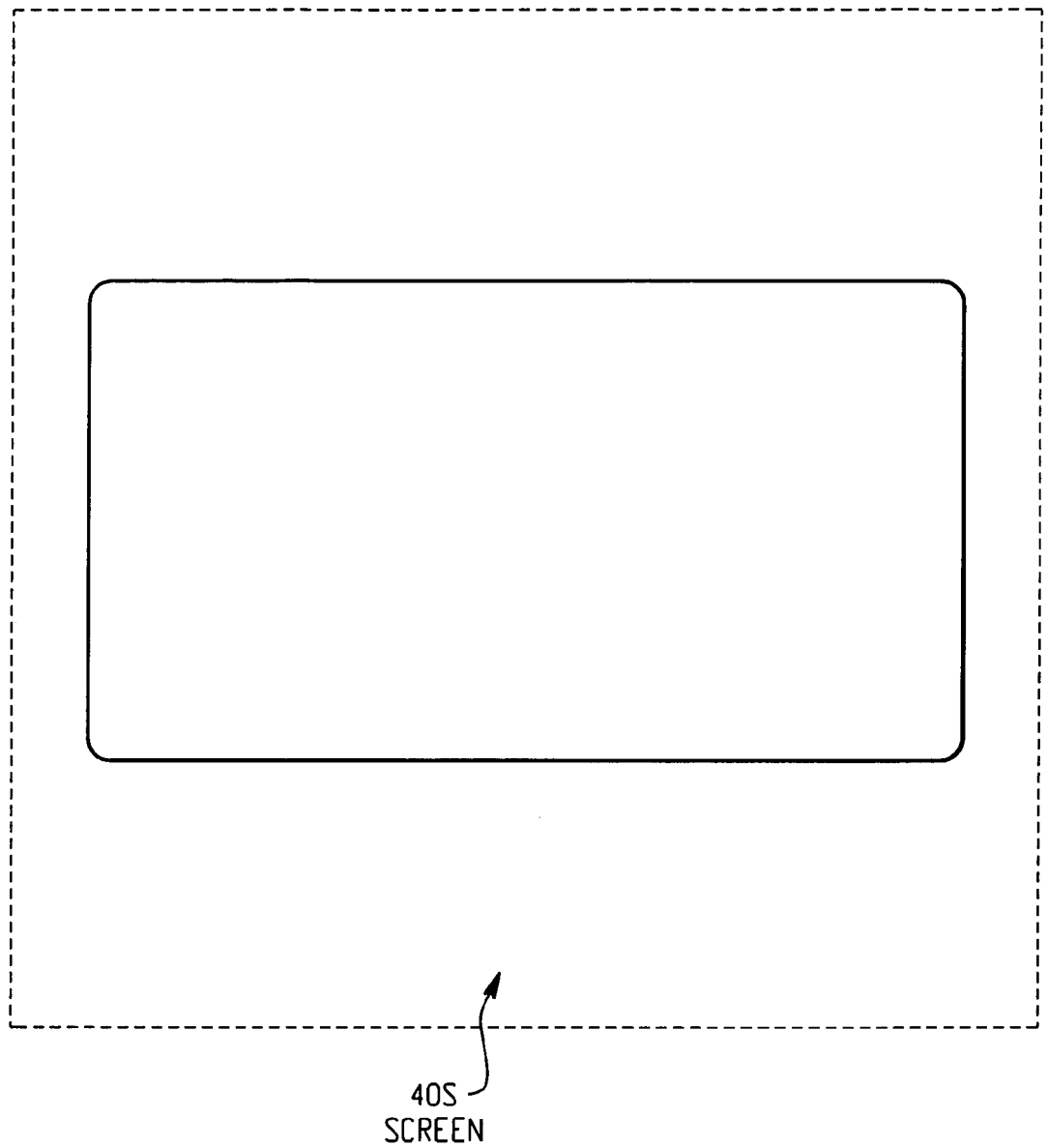
Figure 11G:
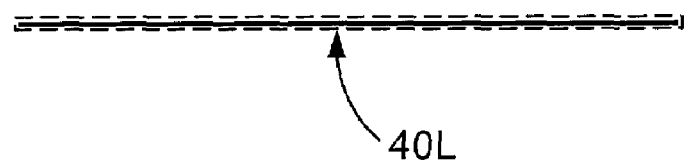
Figure 11F:
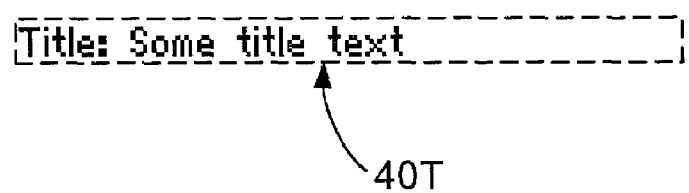
Figure 11E:
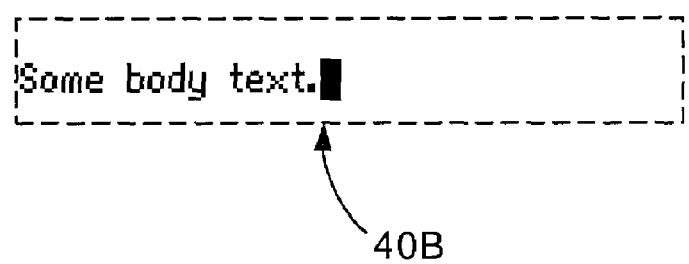
Figure 11D:
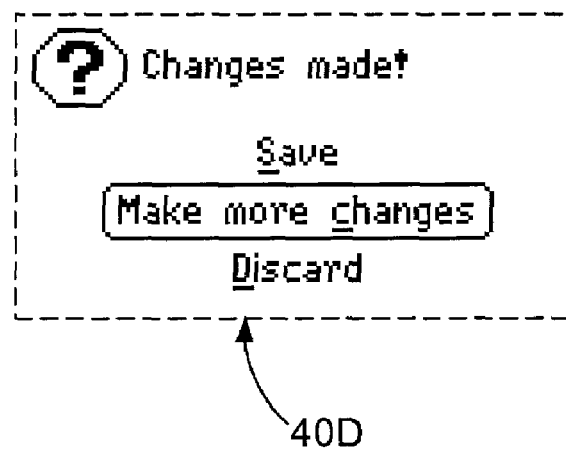

In reference to FIG. 10, the layering of the objects of FIGS. 2–7 into two contexts that are combined is illustrated and described presently. In the upper left hand portion of FIG. 10, clip rectangles for the Screen 40S of FIG. 2, the Title 40T of FIG. 3, the SeparatorBar 40L of FIG. 4, the Scroller 40Q of FIG. 5, and the Text 40B of FIG. 6 are illustrated relative to one another emphasizing the parent child relationship for a first context. Similarly, in the upper right hand portion of FIG. 10, clip rectangles for the Screen 40S of FIG. 2, and the Dialog 40D of FIG. 7 are illustrated relative to one another emphasizing the parent child relationship for a second context. Also illustrated is display 20 that combines the two contexts.

Figure 2:
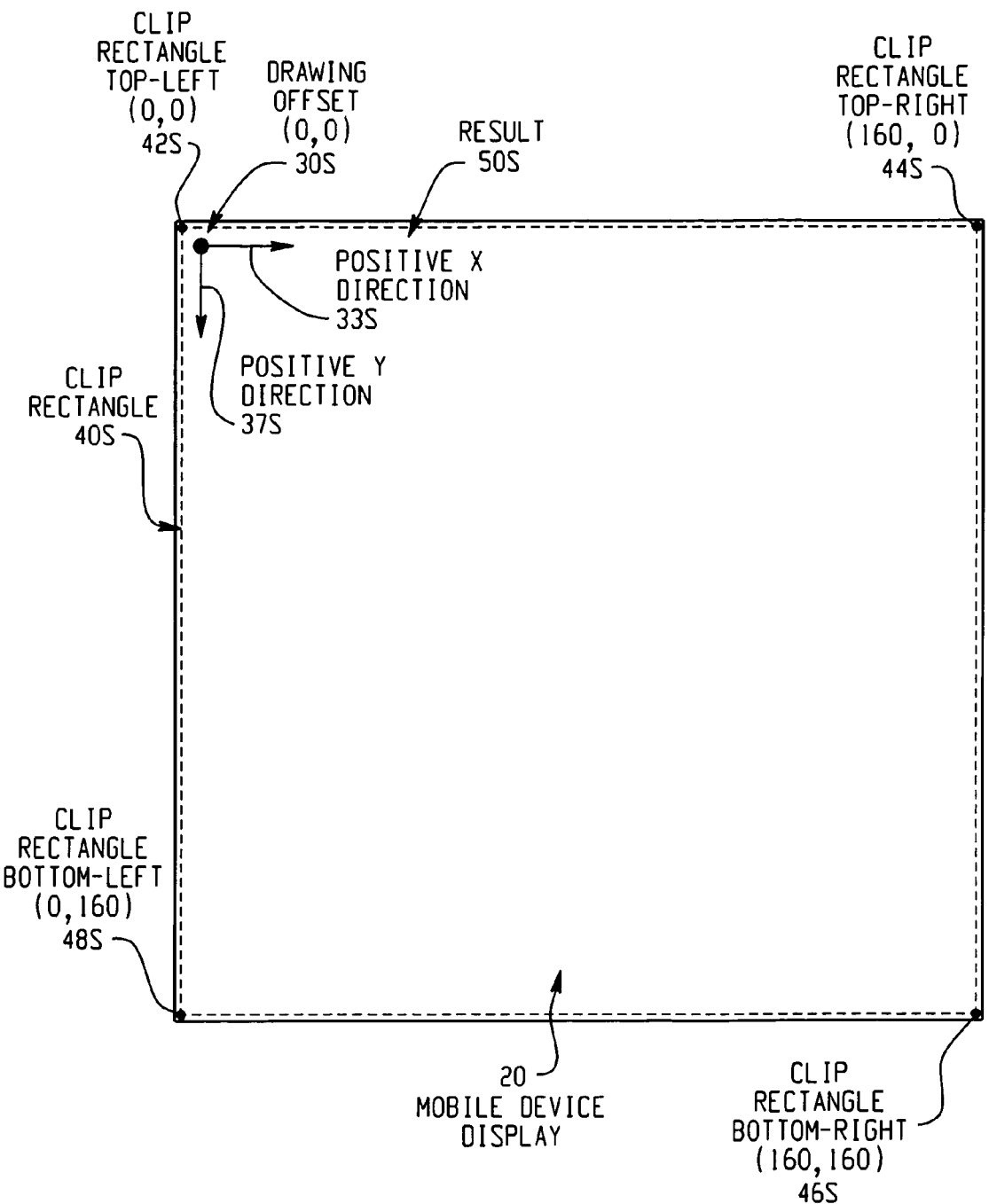
FIG. 2 is a top view of the mobile device display of the device of FIG. 1 illustrating the drawing offset and clip rectangle of a Screen object, according to the present invention.

In reference to FIGS. 11A–G the drawing order of the objects of FIGS. 2–7 as represented by a tree with child and parent graphical objects is illustrated and described presently. In the first context, the Screen 40S of FIG. 2 is drawn—this clears display 20. Next, the children of Screen 40S are traversed in a depth first fashion. Title 40T of FIG. 3 is drawn—this draws the title text; the SeparatorBar 40L of FIG. 4 is drawn—this draws a separator line; the Scroller 40Q of FIG. 5 is drawn—this clears the Scroller. Next, since the Scroller itself has a child—the Text of FIG. 6 is drawn—this draws the body text. In the second context, the Screen 40S of FIG. 2 is drawn—this displays the rounded rectangle for the Dialog. Next, the children of the Screen 40S are traversed in a depth first fashion. Dialog 40D of FIG. 7 is drawn—this draws the icon, message, and buttons. The use of a graphics stack to improve performance, particularly for a mobile device with limited processing power, will be illustrated next in reference to FIG. 12.

Figure 12:
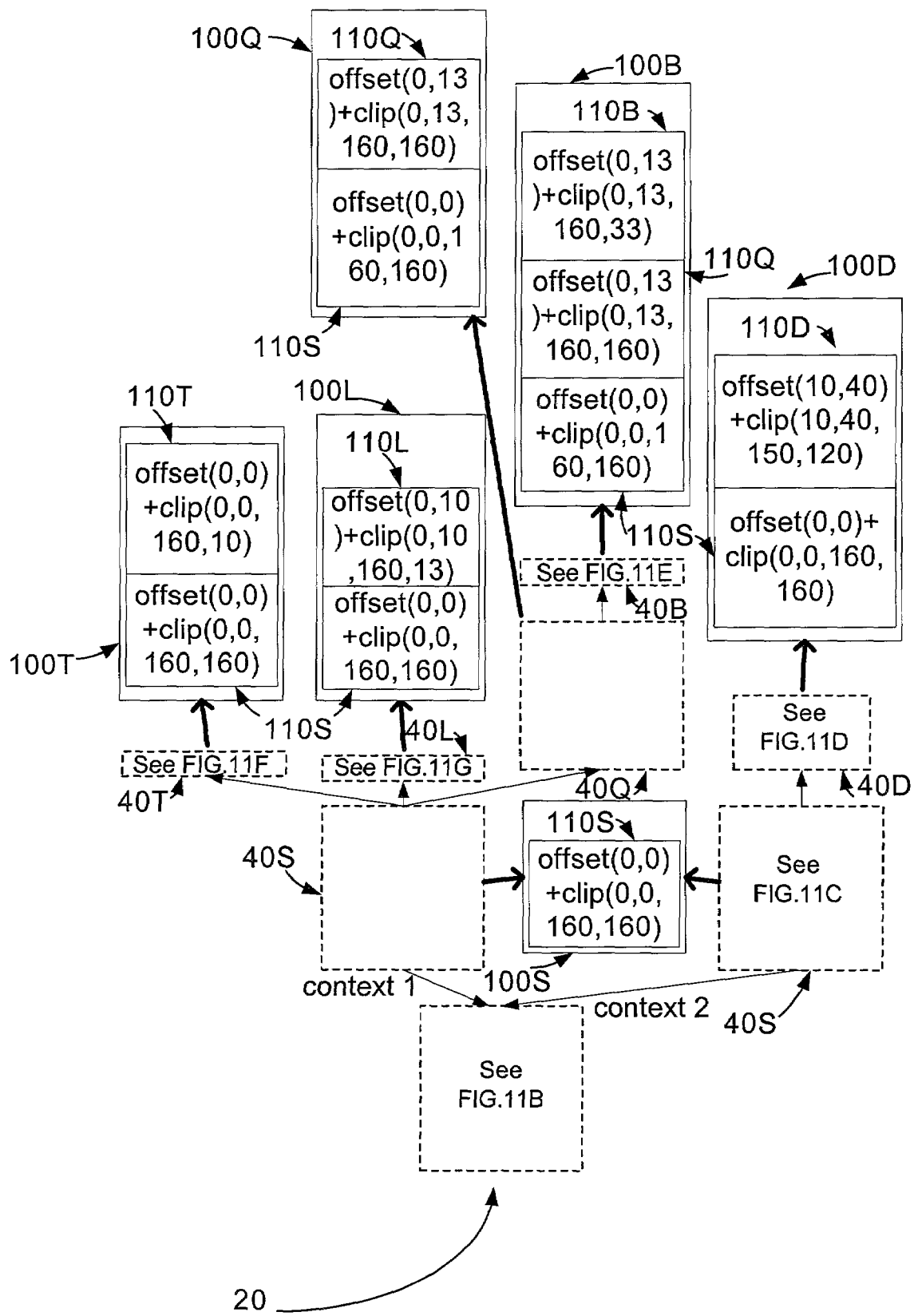
FIG. 12 illustrates the use of a graphics stack for drawing the objects of FIGS. 2–7, according to the present invention.

In reference to FIG. 12, the use of a graphics stack for drawing the objects of FIGS. 2–7 is illustrated and described presently. Stack 100 is illustrated on several occasions as it relates to a particular graphics object such as the Screen, Title, SeparatorBar, Scroller, Text, and Dialog. Stack 100S begins with graphics context 110S, related to the offset 30S and clip rectangle 40S of the Screen, at the top of the stack. In the first context, the Screen 40S of FIG. 2 is drawn—this clears display 20. Next, the children of Screen 40S are traversed in a depth first fashion. The graphics context 110 T of Title 40T is pushed on the stack 100T. Title 40T of FIG. 3 is drawn—this draws the title text, after which the top 110T of the stack 100T is popped 100S to restore the graphics context 110S. The graphics context 110L of the SeparatorBar 40L is pushed on the stack 100L, The SeparatorBar 40L of FIG. 4 is drawn—this draws a separator line, after which the top of 110L of the stack 100L is popped 100S to restore the graphics context 110S. The graphics context 110Q of the Scroller 40Q is pushed on the stack 100Q. The Scroller 40Q of FIG. 5 is drawn—this clears the Scroller. Next, since the Scroller itself has a child—the graphics context 10B of Text 40B is pushed on the stack 100B. The Text of FIG. 6 is drawn—this draws the body text, after which the top of the stack is popped once 100Q to return to the graphics context 110Q of the Scroller 40Q, and a second time 100S to return to the graphics context 110S of the Screen. In the second context, the Screen 40S of FIG. 2 is drawn—this displays the rounded rectangle for the Dialog. Next, the children of the Screen 40S are traversed in a depth first fashion. The graphics context 110D of Dialog 40D is pushed onto the stack 100D. Dialog 40D of FIG. 7 is drawn—this draws the icon, message, and buttons—each of which would also have their corresponding graphics context pushed onto the stack, although not expressly shown in the drawings. Once the Dialog 40D is drawn, the top of the stack 100D is popped restoring the graphics context 110S of Screen 40S.

In reference to FIG. 13, a flowchart illustrating one embodiment of a method of drawing both current and child graphics objects is illustrated and will be described presently. The method provides for drawing graphics in layers on a display of a mobile device using a graphics stack. The graphics stack is used to store pre-computed coordinate values for offsets and clip rectangles in order to improve performance for drawing graphics in layers, such as to display a user interface on a display of a mobile device.

Figure 13:
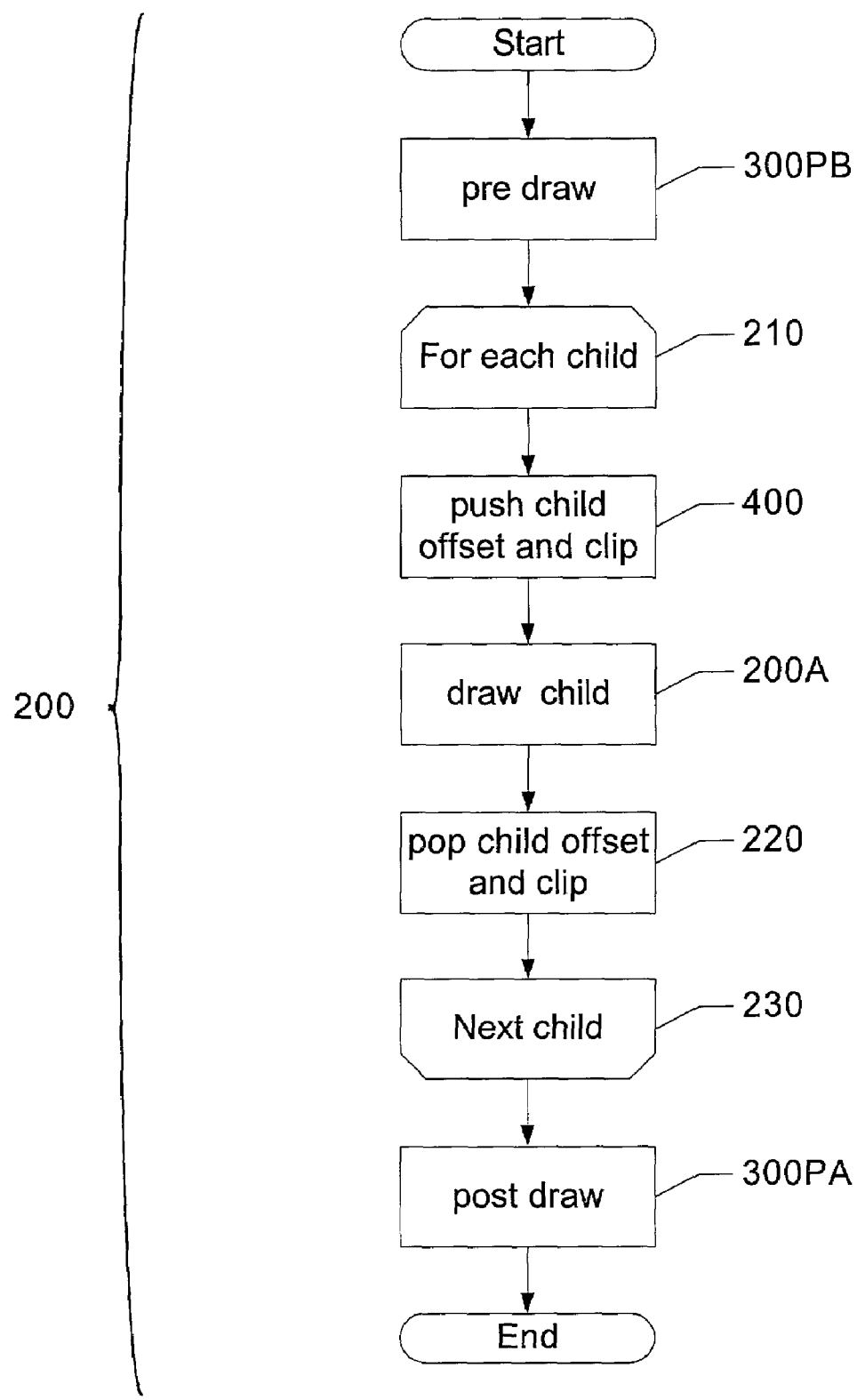
FIG. 13 is a flowchart illustrating one embodiment of a method of drawing both current and child graphics objects, according to the present invention.

At step 300PB on FIG. 13, the Parent graphics context is used to optionally issue drawing instructions before drawing the children. Step 300PB is further detailed in reference to FIG. 14. Next, at step 210, all children are traversed in a depth first fashion, by following steps 400, 200A, 220 and 230 for each child. At step 400, the current child graphics context, based on the drawing offset and clip rectangle, is pushed onto the stack. Step 400 is further detailed in reference to FIG. 15. At step 200A, the current child is drawn, following all the steps of FIG. 13—this step provides the depth first traversal. At step 220, the top of the stack is popped, thereby restoring the graphics context to that of the parent. At step 230, if there are still children to traverse, the method continues at step 210. At step 300PA, the Parent graphics context is used to optionally issue drawing instructions After drawing the children. Step 300PA is further detailed in reference to FIG. 14.

Figure 14:
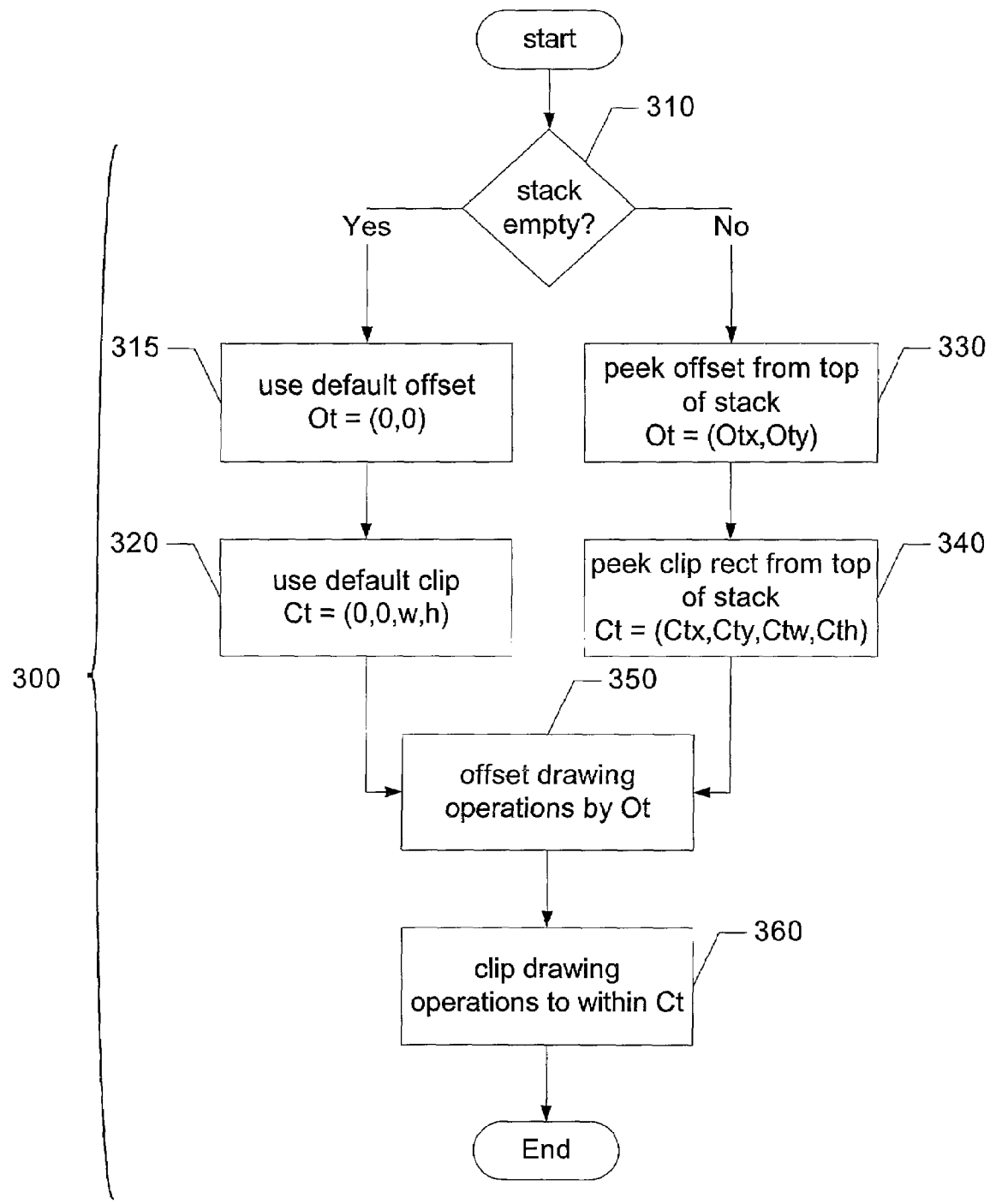
FIG. 14 is a flowchart illustrating one embodiment of a method of drawing current graphics objects, according to the present invention.

In reference to FIG. 14, a flowchart illustrating one embodiment of a method of drawing current graphics objects is illustrated and described presently. At step 310, the stack depth is verified. If the stack is empty—the default context is set at steps 315 and 320 by defining a default drawing offset and clip rectangle respectively. However, if the stack is not empty, it is peeked at steps 330 and 340 in order to obtain the current drawing offset and clip rectangle respectively. At step 350, drawing operations are offset. At step 360, drawing operations are clipped.

Figure 15:
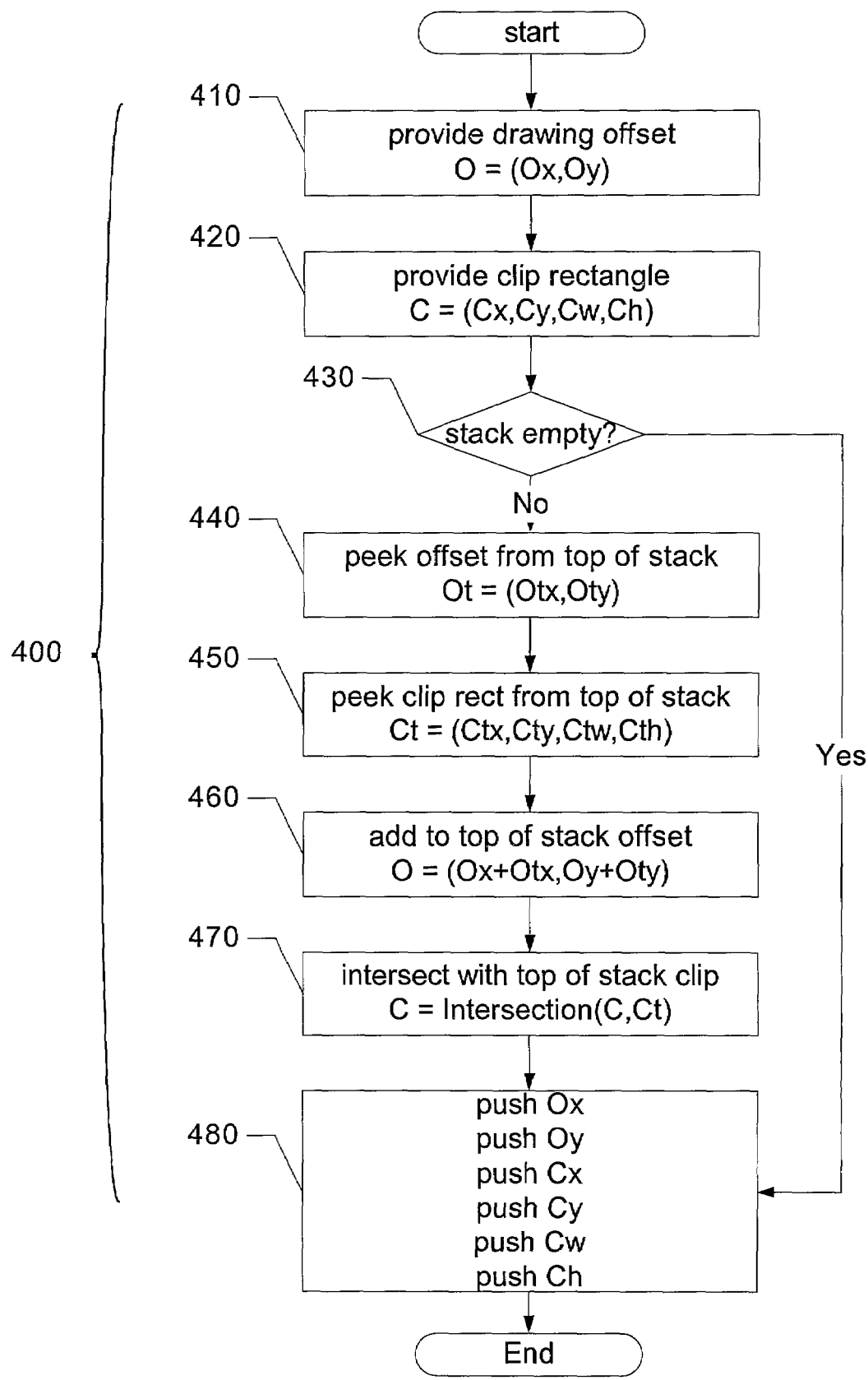
FIG. 15 is a flowchart illustrating one embodiment of a method of pushing offset and clip information on to a graphics stack, according to the present invention.

In reference to FIG. 15, a flowchart illustrating one embodiment of a method of pushing offset and clip Information on to a graphics stack is illustrated and described presently. At step 410, an offset 0 is provided. At step 420, a clip rectangle C is provided. At 430, if the stack is not empty, then steps 440,450,460 and 470 ensue. At step 440, the top of stack offset Ot is obtained. At step 450, the top of stack clip rectangle Ct is obtained. At step 460, the offset 0 provided at step 410 is translated by the value of the top of stack offset Ot. This results in the offset 0 being relative to the offset at the base of the stack so that subsequent drawing operations can be easily and quickly translated. At step 470, the clip rectangle C provided at step 420 is intersected with the value of the top of stack clip rectangle Ct. This results in the clip rectangle C being bound by the clip rectangle at the base of the stack so that subsequent drawing operations can be easily and quickly clipped. At step 480, the offset 0 and clip rectangle Ct are pushed onto the top of the stack. Many stack structures are possible, and one is described next in reference to FIG. 16.

Figure 16:
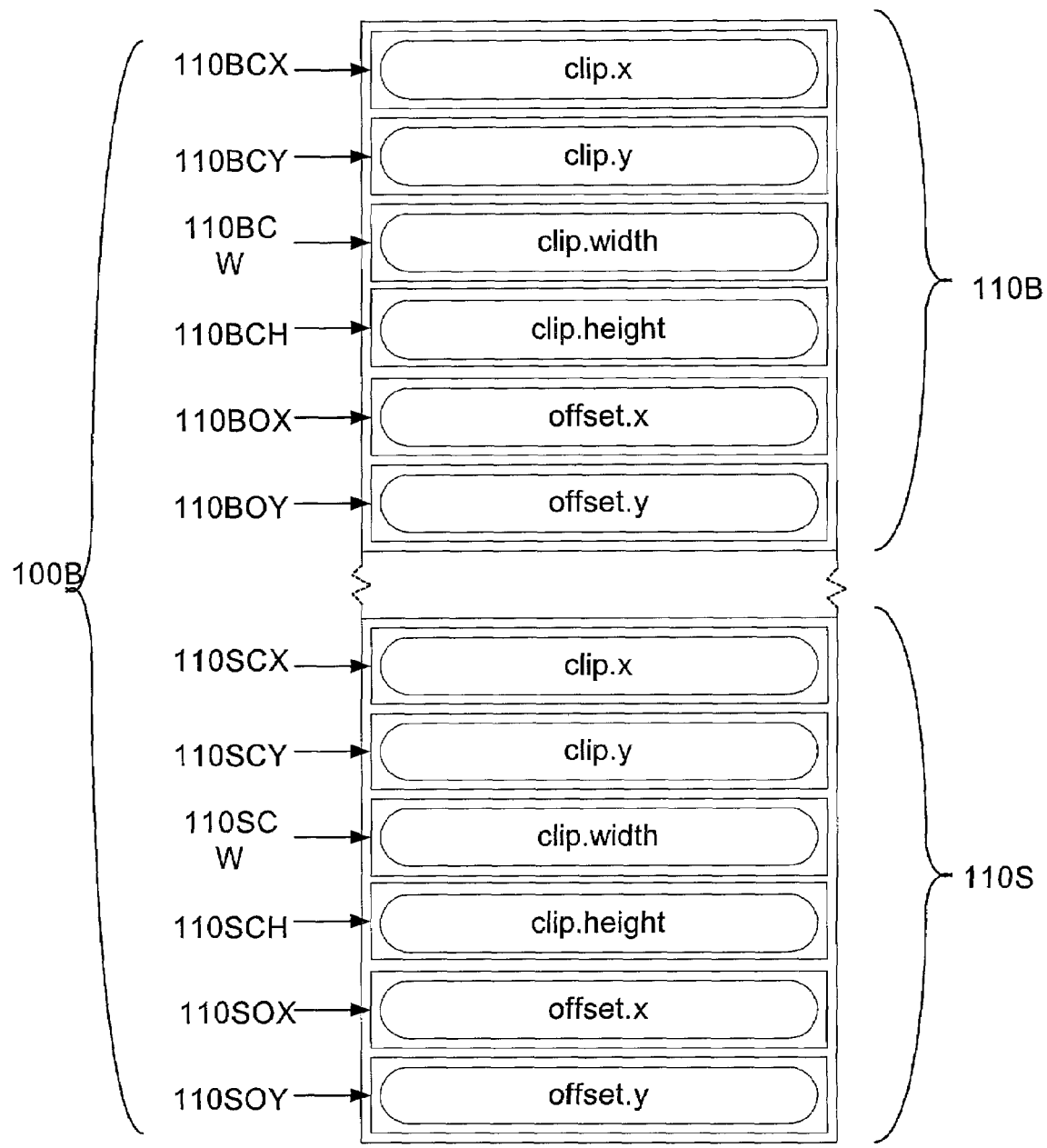
FIG. 16 is a block diagram illustrating one embodiment of a graphics stack data structure, according to the present invention.

In reference to FIG. 16, a block diagram illustrating one embodiment of a graphics stack data structure is illustrated and described presently. The stack 100B corresponds to the stack 100B illustrated in FIG. 12. At the bottom of the stack 110S, the graphics context for Screen 40S is illustrated. At the top of the stack 110B, the graphics context for Text 40B is illustrated. The structure uses six integers related to the offset and clip rectangle of each graphics context. For instance, integer 110BOY is related to the Y coordinate of the drawing offset 30B, integer 110BOX is related to the X coordinate of offset 30B, integer 110BCH is related to the height of clip rectangle 40B, integer 110BCW is related to the width of clip rectangle 40B, 110BCY is related to the Y coordinate of clip rectangle 40B, and 110BCX is related to the X coordinate of clip rectangle 40B.

Figure 17:
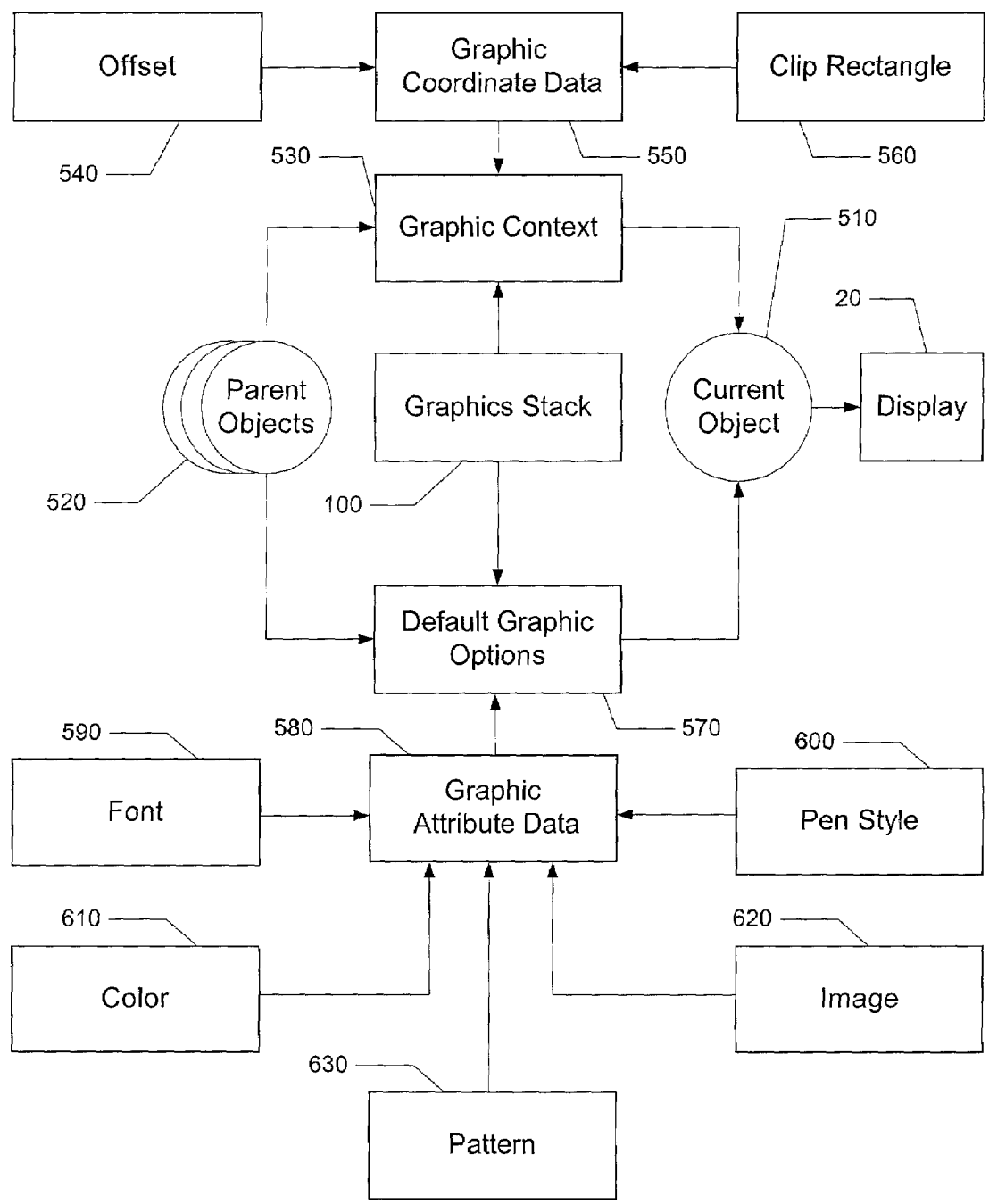
FIG. 17 is a block diagram illustrating one embodiment of a graphics stack system, according to the present invention.

In reference to FIG. 17, a block diagram illustrating one embodiment of a graphics stack system is illustrated and described presently. A graphics stack 100 is used to store a graphic context 530 for a current object 510 which is effecting drawing operations on the display 20. The graphic context 530 consists of graphic coordinate data 550 including offset 540 and clip rectangle 560 as provided by the cumulative effect of parent objects 520 being pushed onto the graphics stack 100, as was described above. However, in addition to the graphic context 530 being stored onto the graphics stack, default graphic options 570 are also optionally stored on the stack. The default graphic options 570 group one or more graphic attribute data 580 including font 590, pen style 600, color 610, image 620 and pattern 630, provided by the cumulative effect of parent objects 520 being pushed onto the graphics stack 100. When current object 510 effects its drawing operations onto display 20, the current object 510 can override the default graphic options 570, so that if and when current object 510 acts as a patent object 520, the default graphic options 570 are inherited by the child objects when they become the current object 510.

It will be appreciated that the above description relates to embodiments by way of example only. Many variations on the invention will be obvious to those knowledgeable in the field, and such obvious variations are within the scope of the invention as described and claimed, whether or not expressly described.

What is claimed as the invention is:

1. A computer-implemented method for performing display-related operations on a display of a mobile device, comprising the steps of:
   creating a graphics stack to store coordinate data for graphics objects to be displayed on the screen of the mobile device,
   wherein the coordinate data specifies regions related to the mobile device's display, said regions defining areas within which the graphics objects may perform display-related operations,
   the coordinate data for at least one of the graphics objects on the graphics stack being modified when a display-related operation would produce a drawing that is wider than coordinate data for one of its parent objects on the graphics stack, causing the drawing to extend past a coordinate data boundary of one of the regions related to the mobile device's display;
   wherein parent-child relationships between the graphics objects form a hierarchy; and
   pushing a graphics object onto the graphics stack based upon a position of the graphics object within the hierarchy,
   wherein a graphics object's display-related operation is performed after it is pushed onto the graphics stack.

2. The method of claim 1 wherein the display-related operations are based upon abstract windowing technology (awt).

3. The method of claim 2 wherein the awt comprises a framework of user interface objects for use on a mobile device.

4. The method of claim 1 wherein the mobile device is a handheld data communication device.

5. The method of claim 1 wherein the mobile device is a cellular telephone.

6. The method of claim 1 wherein the mobile device is a portable data assistant (PDA).

7. The method of claim 1 wherein the graphics stack stores pre-computed coordinate data for the objects.

8. The method of claim 1 wherein the coordinate data comprises offset coordinate data.

9. The method of claim 8 wherein the display has a coordinate system, wherein the offset coordinate data indicates a point in the coordinate system of the display from which a drawing operation is to occur.

10. The method of claim 8 wherein the coordinate data comprises clip rectangle coordinate data.

11. The method of claim 1 wherein the coordinate data comprises clip rectangle coordinate data.

12. The method of claim 11 wherein the clip rectangle coordinate data comprises four points within which a drawing operation is to occur.

13. The method of claim 11 wherein the clip rectangle coordinate data comprises a point, a width extending horizontally from the point, and a height extending vertically from the point, within which a drawing operation is to occur.

14. The method of claim 11 wherein the clip rectangle coordinate data indicates the area of the display which can be drawn.

15. The method of claim 1 wherein the coordinate data is based upon a mobile device's display coordinate system.

16. The method of claim 1 wherein the coordinate data is based upon parent object's relative coordinates.

17. The method of claim 1 wherein the coordinate data is based upon child object's relative coordinates.

18. The method of claim 1 wherein objects are pushed onto the graphics stack in a depth first fashion.

19. The method of claim 18 wherein an object is popped from the graphics stack after the object's display-related operation has been performed.

20. The method of claim 19 wherein popping an object from the graphics stack restores the graphics context to that of the object's parent.

21. The method of claim 19 wherein objects are popped from the graphics stack until the base object remains on the graphics stack.

22. The method of claim 21 wherein the base object specifies an original graphics context.

23. The method of claim 1 wherein if the graphics stack is empty then a default graphics context is established for the graphics stack.

24. The method of claim 1 wherein a child object's coordinate data stored on the graphics stack is modified based upon a parent object's coordinate data that is stored on the graphics stack.

25. The method of claim 24 wherein the modified coordinate data decreases computation power needed to perform a display-related operation.

26. The method of claim 1 wherein an object's display-related operation is performed based upon when the object is pushed onto the graphics stack.

27. The method of claim 1 wherein an object's display-related operation is performed when the object is pushed onto the graphics stack.

28. The method of claim 1 wherein objects are popped from the graphics stack based upon the position of the object within the graphics stack,
   wherein the pushing onto and popping of the objects from the graphics stack result in drawing graphics in layers on the display of the mobile device.

29. The method of claim 1 wherein a first set of objects form a hierarchy of objects for a first context, wherein a second set of objects form a hierarchy of objects for a second context,
   wherein the first set of objects are pushed onto and popped from the graphics stack based upon position of the objects within the hierarchy of the first context,
   wherein the second set of objects are pushed onto and popped from the graphics stack based upon position of the objects within the hierarchy of the second context,
   wherein the pushing and popping of the objects for the first and second contexts results in generating a layering of drawings on the display of the mobile device.

30. The method of claim 29 wherein the second context comprises a modal context.

31. The method of claim 1 herein the modified coordinate data ensures that no drawing operations occur outside the bounds of the mobile device's display.

32. The method of claim 1 wherein the display-related operation results in graphics being displayed on the mobile device's display that exceeds a width limit designated by a parent object on the graphics stack.

33. A computer-implemented method for performing display related operations on a display of a mobile device, comprising the steps of:
    creating a graphics stack to store coordinate data for graphics objects to be displayed on the screen of the mobile device,
    the coordinate data specifies regions being related to the mobile device's display, said regions defining areas within which the graphics objects may perform display-related operations,
    the coordinate data for at least one of the graphics objects on the graphics stack being modified when a display-related operation would produce a drawing that exceeds the bounds of at least one of its parent objects on the graphics stack, causing the drawing to extend past a coordinate data boundary of one of the regions related to the mobile device's display;
    parent-child relationships between the graphics objects forming a hierarchy;
    pushing a graphics object onto the graphics stack based upon position of the graphics object within the hierarchy,
    a graphics object's display-related operation being performed after it is pushed onto the graphics stack.

34. The method of claim 33 wherein the modified coordinate data ensures that no drawing operations occur outside the bounds of the mobile device's display.

35. The method of claim 33 wherein the display-related operation results in graphics being displayed on the mobile device's display that exceeds a height limit designated by a parent object on the graphics stack.

36. The method of claim 1 wherein a first object occupies an upper position within the graphics stack relative to a second object,
    wherein graphic context of the first object is based upon graphic context of the second object.

37. The method of claim 1 wherein the object's display-related operation to be performed comprises generating a view port for holding child objects that may be wider or taller than the view port.

38. The method of claim 1 wherein the mobile device exhibits computational power limitations, wherein the method reduces computational power for using a framework of graphics-related objects on the mobile device.

39. The method of claim 38 wherein the graphics stack is used to store pre-computed coordinate values in order to improve computation performance for drawing graphics.

40. Computer software stored on a computer readable media, the computer software comprising program code for carrying out a method according to claim 1.

41. The method of claim 1 further comprising the step of:
    storing at least one graphic attribute data for objects in addition to coordinate data on the graphics stack,
    wherein the attribute data specifies graphics options related to the mobile device's display, said options defining the manner in which the objects may perform display-related operations;
    wherein the attribute data of a parent on the stack provides default values for graphics options for the parent's children on the stack; and
    wherein the attribute data of a child on the stack overrides the corresponding default values.

42. The method of claim 41 wherein the graphics attribute data is selected from the group consisting of font, color, pen style, fill pattern, and image.

43. The method of claim 41 wherein a first object occupies an upper position within the graphics stack relative to a second object,
    wherein a graphic attribute of the second object is based upon a graphic attribute of the first object.

44. Computer software stored on a computer readable media, the computer software comprising program code for carrying out a method comprising the steps of:
    creating a graphics stack to store coordinate data for graphics objects, wherein the graphics objects perform display-related operations on a display of a mobile device, wherein parent-child relationships between the graphics objects form a hierarchy,
    wherein the coordinate data specifies regions related to the mobile device's display, said regions defining areas within which the graphics objects may perform display-related operations,
    the coordinate data for at least one of the graphics objects on the graphics stack being modified when a display-related operation would produce a drawing that is wider than coordinate data for one of its parent objects on the graphics stack, causing the drawing to extend past a coordinate data boundary of one of the regions related to the mobile device's display; and
    pushing a graphics object onto the graphics stack based upon position of the graphics object within the hierarchy,
    wherein a graphics object's display-related operation is performed after it is pushed onto the graphics stack.

45. An apparatus for performing display-related operations on a display of a mobile device, comprising:
    means for creating a graphics stack to store coordinate data for graphics objects to be displayed on the screen of the mobile device, wherein parent-child relationships between the objects form a hierarchy;
    wherein the coordinate data specifies regions related to the mobile device's display, said regions defining areas within which the graphics objects may perform display-related operations,
    the coordinate data for at least one of the graphics objects on the graphics stack being modified when a display related operation would produce a drawing that is wider than coordinate data for one of its parent objects on the graphics stack, causing the drawing to extend past a coordinate data boundary of one of the regions related to the mobile device's display; and
    means for pushing a graphics object onto the graphics stack based upon position of the graphics object within the hierarchy,
    wherein a graphics object's display-related operation is performed after it is pushed onto the graphics stack.

* * * * *